United States Patent
Hirano et al.

(10) Patent No.: US 6,630,007 B2
(45) Date of Patent: Oct. 7, 2003

(54) AIR CLEANER FOR INTERNAL COMBUSTION ENGINE

(75) Inventors: Michio Hirano, Akashi (JP); Tetsuaki Shirai, Kobe (JP); Shinya Yoshidome, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/924,513

(22) Filed: Aug. 9, 2001

(65) Prior Publication Data

US 2002/0020157 A1 Feb. 21, 2002

(30) Foreign Application Priority Data

Aug. 15, 2000 (JP) .................................. 2000-246299

(51) Int. Cl.$^7$ .............................................. B01D 50/00
(52) U.S. Cl. .................... 55/385.3; 55/498; 55/510; 55/DIG. 28; 180/219; 123/198 E
(58) Field of Search .................... 55/385.3, DIG. 28, 55/498, 510; 123/198 E; 180/219

(56) References Cited

U.S. PATENT DOCUMENTS

| | | | | |
|---|---|---|---|---|
| 3,791,112 A | * | 2/1974 | Lidstone | 55/385.3 |
| 3,849,093 A | * | 11/1974 | Konishi et al. | 55/385.3 |
| 4,402,379 A | * | 9/1983 | Hoshi | 55/385.3 |
| 4,509,613 A | * | 4/1985 | Yamaguchi | 55/385.3 |
| 4,594,083 A | * | 6/1986 | Hiraizumi | 55/385.3 |
| 4,648,474 A | * | 3/1987 | Shinozaki et al. | 180/219 |
| 5,492,086 A | * | 2/1996 | Kuhns | 123/198 E |
| 5,655,497 A | * | 8/1997 | Nakajima | 123/198 E |
| 6,234,136 B1 | * | 5/2001 | Choi et al. | 123/198 E |

FOREIGN PATENT DOCUMENTS

| | | |
|---|---|---|
| JP | 3-8650 | 1/1991 |
| JP | 4-61614 | 5/1992 |
| JP | 5-10772 U | 2/1993 |
| JP | 5-504908 | 7/1993 |
| JP | 6-63856 | 3/1994 |
| JP | 9-508850 | 9/1997 |
| WO | WO 91/13675 | 9/1991 |
| WO | WO 95/19832 | 7/1995 |

* cited by examiner

Primary Examiner—David A. Simmons
Assistant Examiner—Minh-Chau T. Pham
(74) Attorney, Agent, or Firm—Oliff & Berridge, PLC

(57) ABSTRACT

An air cleaner for an internal combustion engine facilitates is made compact and maintenance work for cleaning or replacing the cleaner element of the same. An air cleaner case (14) holding a cleaner element (13) is a three-part structure essentially consisting of a body (16) having opposite open ends and provided with an air inlet (40), a bottom wall (15) detachably joined to one of the opposite open ends of the body (16) and connected to the air intake passage of the carburetor (5), and a cover (17) detachably joined to the other open end of the body (16). The bottom wall (15), the body (16) and the cover (17) are fastened together by a stud bolt (25) and a fastening nut (37). The cover (17) has a concave part (44) defining a space for receiving the fastening nut (37) and provided with drain holes (50). When the air cleaner (4) is disposed above the carburetor (5), the drain holes (50) are positioned right above the fuel flow adjusting screws (11) of the carburetor (5). A screw operating tool inserted from above the cover (17) in each of the drain holes is able to reach each of the fuel flow adjusting screw (11).

7 Claims, 6 Drawing Sheets

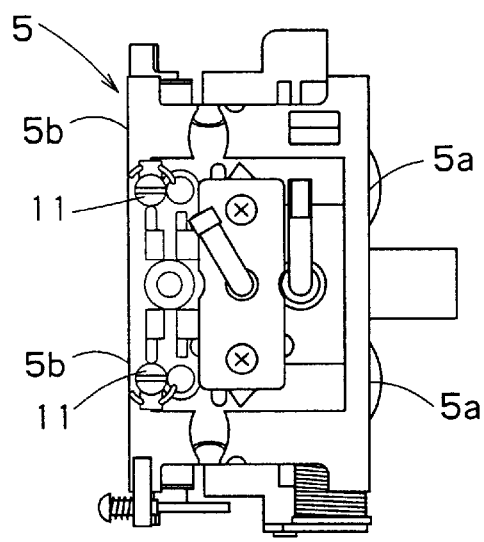
F I G. 3
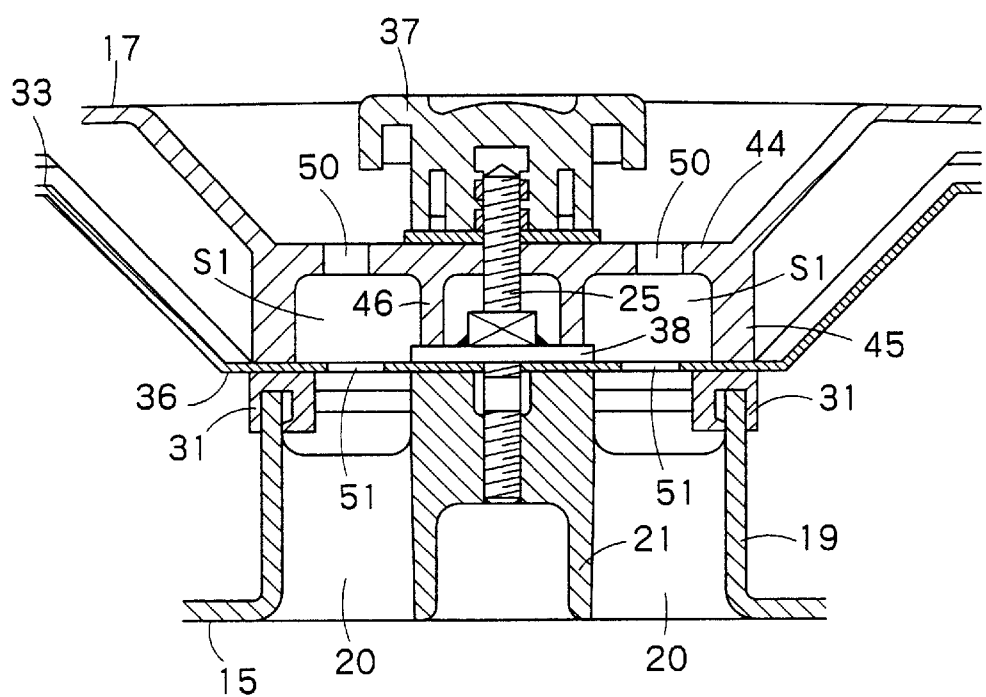
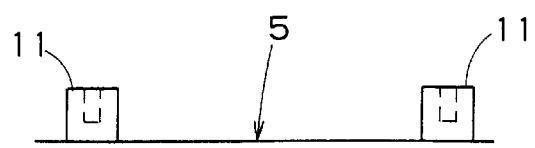
F I G. 4

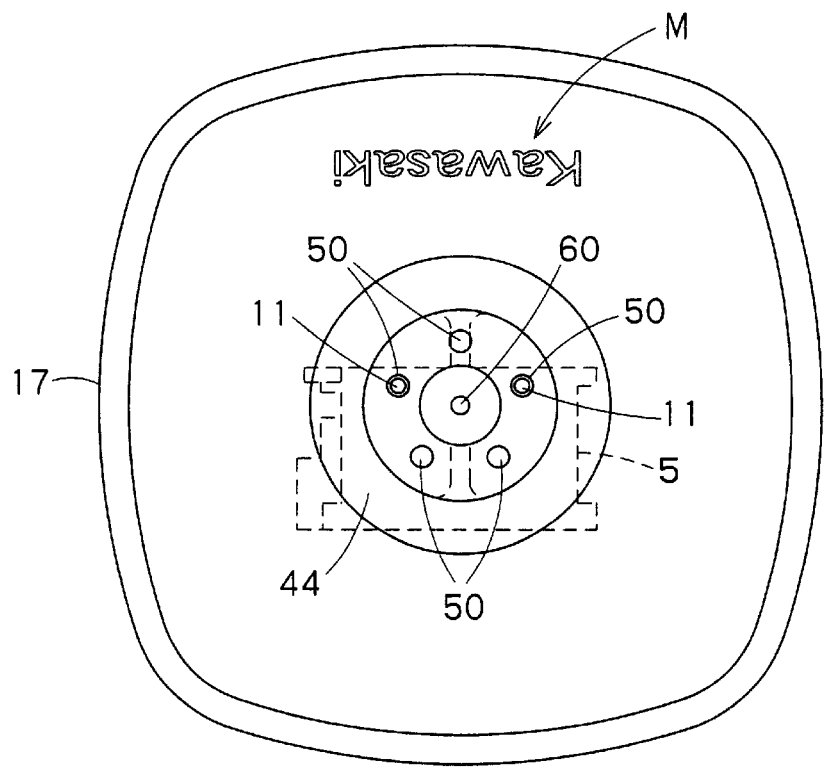
F I G. 5
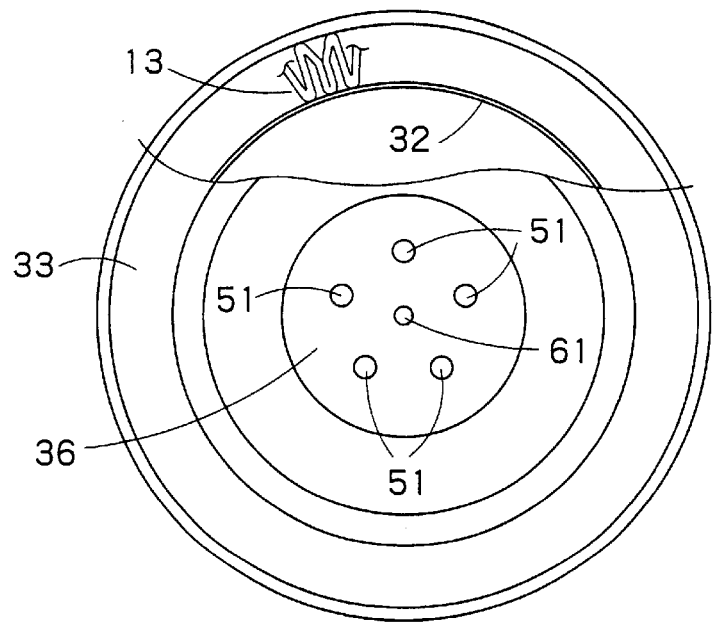
F I G. 6

PRIOR ART

AIR CLEANER FOR INTERNAL COMBUSTION ENGINE

BACKGROUND OF THE INVENTION

1. Field of the Invention

The present invention relates to an air cleaner for an internal combustion engine and, more particularly, to an air cleaner for an internal combustion engine, to be used in combination with a carburetor.

2. Description of the Related Art

Referring to FIG. 9 showing an ordinary air cleaner disposed above a carburetor 115 included in an internal combustion engine, the air cleaner has an air cleaner element 100 (hereinafter referred to simply as "cleaner element") for filtering air, and an air cleaner case 101 containing the cleaner element 100. The air cleaner case 101 includes a cover 104 having a top wall 103, and a bottom wall 105. The top wall 103 of the cover 104, a top plate 110 included in the cleaner element 100, and the bottom wall 105 are fastened together by a bolt 106 set upright on a central part of the bottom wall 105 and extending through the cleaner element 100 and the top wall 103, and a nut 107 screwed on the bolt 106. An air outlet pipe 112 is formed integrally with the bottom wall 105 so as to open downward. An L-shaped connecting pipe 113 connects the air outlet pipe 112 to the air inlet of the carburetor 115. An air inlet pipe 116 is formed integrally with the cover 104 so as to project outward from the side wall of the cover 104. An intake duct 120 is connected to the air inlet pipe 116. The open free end, not shown, of the intake duct 120 is located in a space where air scarcely contaminated with dust and water can be taken in.

The cleaner element 100 has a generally annular shape. A clean air chamber surrounded by the cleaner element 100 is connected to the air outlet pipe 112. An annular space around the cleaner element 100 is connected to the air inlet pipe 116. The top wall 103 of the cover 104 has a flat upper surface to prevent dust and water from staying on the top wall 103. An internal engine provided with an air cleaner disposed above a carburetor as shown in FIG. 9 is disclosed in JU-A No. 5-10772.

The air cleaner shown in FIG. 9 has the following problems.

(1) Work for removing the cover 104 when cleaning or replacing the cleaner element 100 is troublesome because the intake duct 120 must be disconnected from the cover 104.

(2) The position of the open free end of the intake duct 120 may be changed according to a type of a work machine or apparatus mounted with the internal combustion engine and, in some cases, the position of the air inlet pipe 116 is changed. However, since the trade name, the manufacturer's name, specifications and the like are often indicated on the top wall 103 of the cover 104, the direction of letters printed on the top wall 103 deviates from a desired direction when the cover 104 is turned about the axis of the bolt 106 to change the position of the air intake pipe 116.

(3) Since the top wall 103 has a flat upper surface to prevent dust and water from staying thereon, the nut 107 protrudes upward from the upper surface of the top wall 103 and, consequently, the overall height of the internal combustion engine increases. If it is desired to reduce the overall height of the internal combustion engine, the capacity of the air cleaner must be reduced. It is possible to secure a desired capacity of the air cleaner without increasing the overall height of the internal combustion engine by forming a depression 102 as indicated by imaginary lines in a central part of the top wall 103 so that the nut 107 sinks in the depression 102. However, dust and water will stay in the depression 102, the water and dust staying in the depression 102 spoil the appearance of the air cleaner and corrode the bolt 106 and the nut 107. Consequently, the nut 107 cannot be easily removed from the bolt 106, which makes the removal of the cover 104 difficult. It is possible that the water or dust collected in the depression 102 will drop through the central hole of the top wall 103 and will adhere to the cleaner element 100 when removing the cover 104.

(4) The air cleaner case 101 disposed above the carburetor 115 makes difficult the adjustment of a fuel flow adjusting screw 130, such as an idle adjusting screw. A large space must be formed around the fuel flow adjusting screw 130 and it is difficult to dispose the air cleaner close to the carburetor 115.

SUMMARY OF THE INVENTION

The present invention has been made to solve the foregoing problems and it is therefore an object of the present invention to provide a compact air cleaner for an internal combustion engine, facilitating maintenance work thereof.

Another object of the present invention is to provide an air cleaner facilitating work for adjusting a carburetor disposed under the air cleaner.

According to a first aspect of the present invention, an air cleaner for an internal combustion engine, combined with a carburetor comprises a cleaner element for cleaning air; and an air cleaner case holding the cleaner element therein; wherein the air cleaner case includes a body having a pair of opposite open ends and provided with an air inlet, a base wall capable of detachably joined to one of the open ends of the body and provided with an air outlet connected to the carburetor, and a cover detachably joined to the other open end of the body.

In the air cleaner according to the first aspect of the present invention, it is preferable that the cover of the air cleaner case is detachably joined to the body by a screw-type fastening means, the cover has a concave part defining a space for receiving the head of a screw or a nut included in the screw-type fastening means, and drain holes are formed in the concave part to drain water collected in the concave part. Preferably the base wall is provided in its central part with a tubular wall projecting toward the concave part of the cover, and the drain holes are positioned inside the tubular wall. Preferably, the air cleaner case is disposed above the carburetor with the drain holes formed in the concave part of the cover located substantially right above fuel flow adjusting screws included in the carburetor, and a screw operating tool inserted from above the cover in each of the drain holes are able to reach each of the fuel flow adjusting screws.

According to a second aspect of the present invention, an air cleaner for an internal combustion engine, combined with a carburetor comprises a cleaner element for cleaning air; and an air cleaner case holding the cleaner element therein; wherein the air cleaner case includes a body, and a cover detachably joined to the body by a screw-type fastening means, the cover has a concave part defining a space for receiving the head of a screw or a nut included in the screw-type fastening means, and drain holes are formed in the concave part to drain water collected in the concave part.

In the air cleaner according to the second aspect of the present invention, it is preferable that the air cleaner case is provided in its central part with a tubular wall projecting toward the concave part of the cover, and the drain holes are positioned inside the tubular wall. Preferably, the air cleaner case is disposed above the carburetor with the drain holes formed in the concave part of the cover being located substantially right above fuel flow adjusting screws included in the carburetor, and a screw operating tool inserted from above the cover in each of the drain holes are able to reach each of the fuel flow adjusting screws.

According to the first aspect of the present invention, the air cleaner case holding the cleaner element therein is a three-part structure including the body having the pair of opposite open ends and provided with the air inlet, the base wall capable of detachably joined to one of the open ends of the body and provided with the air outlet connected to the carburetor, and the cover detachably joined to the other open end of the body. Therefore, the interior of the air cleaner can be inspected, and the cleaner element can be cleaned or replaced, by removing the cover without removing the body, so that the maintenance work can be easily carried out. Also, the position of the air inlet can be changed by turning or inverting only the body to change the position of the body without changing the position of the cover and the base wall on the side of the carburetor. Thus, the air inlet can be placed at a proper position even when the air cleaner is used in various work machines and apparatuses that take in air into the air cleaner from different spaces. Since the position of the cover does not need to be changed, the initial position and direction of letters indicating manufacturer's name, instructions and the like printed on the cover can be maintained.

According to the first and the second aspect of the present invention, the cover of the air cleaner case has the concave part defining the space for receiving the head of the screw or the nut included in the screw-type fastening means, and the drain holes are formed in the concave part to drain water collected in the concave part. Therefore, the air cleaner having a desired capacity can be formed without increasing the overall height of the internal combustion engine, because the air cleaner can secure a sufficient air passage area without increasing the height thereof. Further, since the cover is provided with the drain holes, water is unable to stay in the concave part of the cover. Thus, dust collected in the concave part can be easily removed through the drain holes by cleaning the concave part with water. Since dust and water are unable to collect in the concave part, the air cleaner can be maintained in a satisfactory appearance, fastening means including a bolt and a nut are prevented from rusting and seizing.

According to the first and the second aspect of the present invention, the air cleaner is provided with the tubular wall projecting from the central part of the base wall toward the concave part of the cover and the drain holes are positioned inside the tubular wall. Therefore, the contamination of the cleaner element with dust and water can be effectively prevented.

According to the first and the second aspect of the present invention, the air cleaner case is disposed above the carburetor with the drain holes formed in the concave part of the cover being located substantially right above the fuel flow adjusting screws included in the carburetor, and a screw operating tool inserted from above the cover in each of the drain holes is able to reach each of the fuel flow adjusting screws. Therefore, the drain holes formed in the concave part of the cover can be used as access holes through which the screw operating tool gains access to the fuel flow adjusting screw, and hence fuel flow adjusting work for adjusting the fuel flow adjusting screw of the carburetor disposed below the air cleaner can be easily carried out.

BRIEF DESCRIPTION OF THE DRAWINGS

FIG. 3 is a plan view of a carburetor shown in FIGS. 1 and 2;

FIG. 4 is an enlarged longitudinal sectional view of a central part of the air cleaner shown in FIGS. 1 and 2;

FIG. 5 is a plan view of a cover of the air cleaner shown in FIGS. 1 and 2;

FIG. 6 is a plan view of a cleaner element of the air cleaner shown in FIG. 2;

DESCRIPTION OF THE PREFERRED EMBODIMENTS

Figure 1:
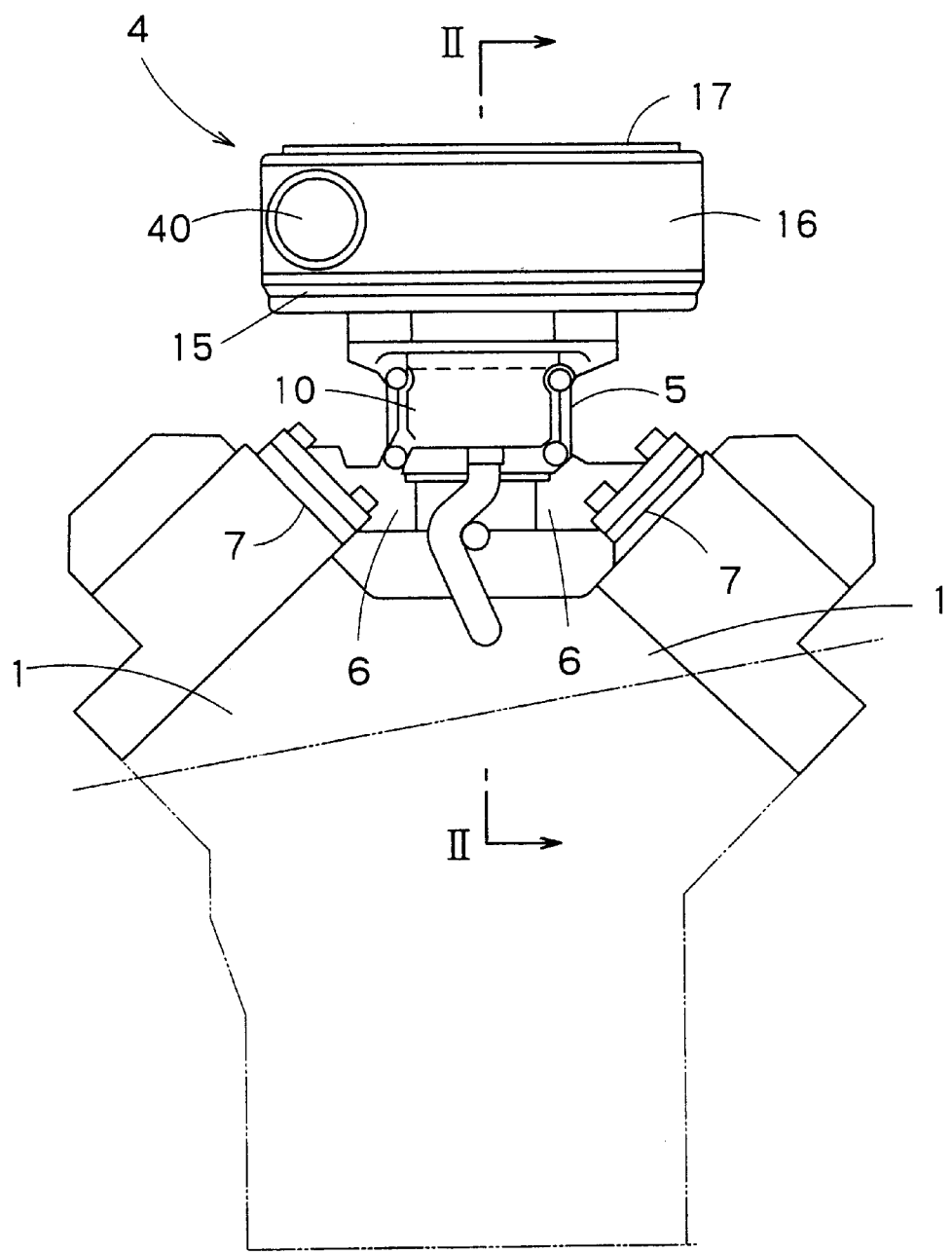
FIG. 1 is a rear view of a two-cylinder V-engine provided with an air cleaner in a preferred embodiment of the present invention.

Referring to FIG. 1 showing a two-cylinder V-engine provided with an air cleaner in a preferred embodiment of the present invention in a rear view, a carburetor 5 is disposed in a space between two cylinders (banks) 1 which are arranged so as to form an acute angle, and an air cleaner 4 is disposed above the carburetor 5. The outlet of the intake passage of the carburetor 5 is connected to a bifurcate intake manifold 6. The two outlets of the intake manifold 6 are connected to the intake ports 7 of the cylinders 1, respectively.

Figure 2:
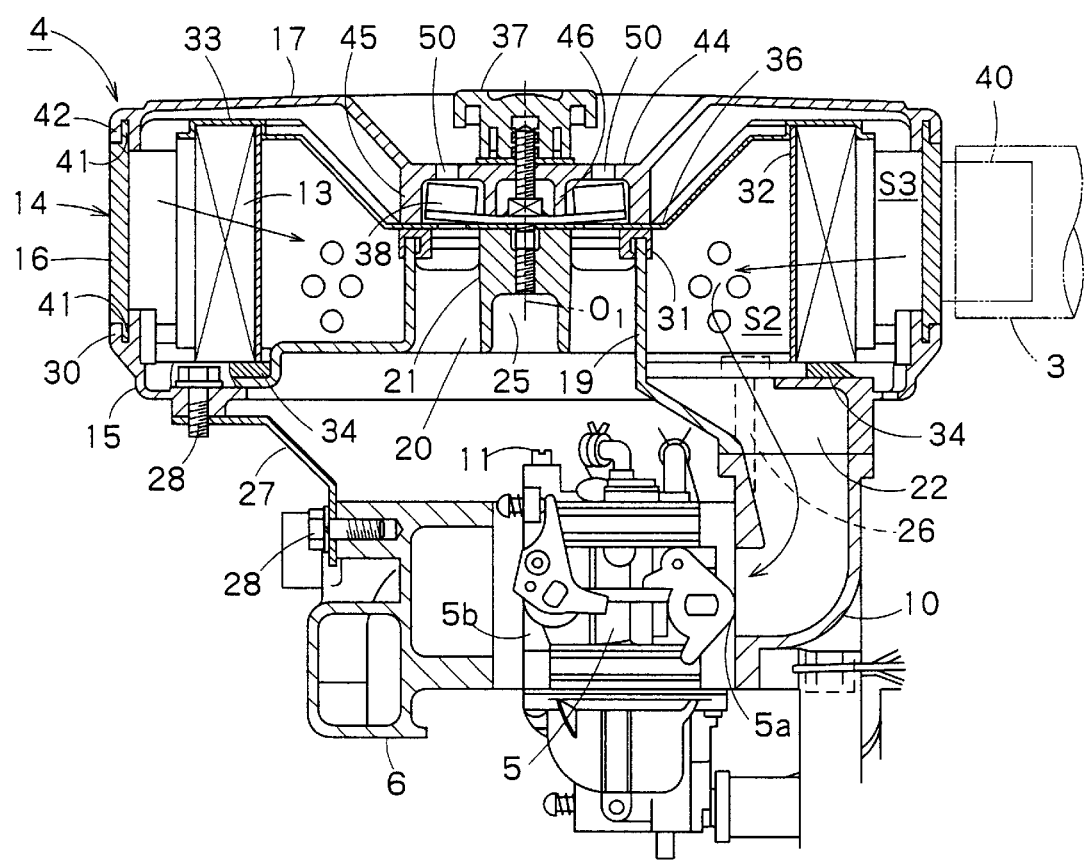
FIG. 2 is an enlarged sectional view taken on line II—II in FIG. 1.

FIG. 2 is an enlarged sectional view taken on line II—II in FIG. 1. An L-shaped connecting pipe 10 is connected to the inlet 5a of the intake passage of the carburetor 5 so as to extend upward. An idle adjusting screw 11, i.e., a fuel flow adjusting screw, projects from an upper part of a wall around an outlet 5b of the intake passage of the carburetor. As generally known, the idle adjusting screw 11 is disposed near a throttle valve to adjust the flow of the fuel through a slow jet.

The air cleaner 4 has an air cleaner case 14 and an annular air cleaner element (hereinafter referred to simply as "cleaner element") 13 held in the air cleaner case 14. The air cleaner case 14 is a three-part structure essentially consisting of a die-cast bottom wall (base wall) 15, a resin body 16 having opposite open ends, and a resin cover 17. A tubular wall 19 rising from a central part of the bottom wall 15 is formed integrally with the bottom wall 15. A cylindrical block 21 is formed integrally with and connected by ribs 20 to the tubular wall 19. An air outlet 22 is formed integrally with the bottom wall 15 so as to project downward from a part outside the tubular wall 19. The block 21 is provided with an axial threaded hole in its central part, and a lower threaded part of a stud bolt 25 is screwed in the threaded hole of the block 21 and the stud bolt 25 extends upright. A part of the bottom wall 15 corresponding to the air outlet 22 is fastened to the upper end of the connecting pipe 10 with a bolt 26. A bracket 27 has one end fastened with a bolt 28 to an end part of the bottom wall 15 opposite to the part provided with the air outlet 22 and the other end fastened with a bolt 28 to the intake manifold 6. A groove 30 is formed in the upper surface of a rising peripheral part of the bottom wall 15. An annular rubber seal 31 is put on the upper end of the tubular wall 19.

A holding tube 32 formed by processing a perforated metal sheet is fitted to the inner circumferential surface of the cleaner element 13. A circular metal top plate 33 is bonded to the upper end of the cleaner element 13 and an annular rubber sheet 34 is bonded to the lower end of the cleaner element 13. A central part of the top plate 33 is depressed to form a concave part 36 having the shape of a truncated cone. An annular rubber sheet 34 is placed on the upper surface of the bottom wall 15. The cleaner element 13 is placed on the rubber sheet 34 with the concave part 36 being seated on the annular rubber seal 31 put on the tubular wall 19, and the cleaner element 13 is fastened to the bottom wall 15 by screwing a wing nut 38 on the stud bolt 25. Consequently, the annular rubber sheet 34 is pressed against the bottom wall 15 and the concave part 36 is pressed against the annular rubber seal 31. Thus, a clean air space S2 inside the cleaner element 13 is isolated from a space outside the cleaner element 13 and a space inside the tubular wall 19.

An air inlet 40 is formed integrally with the body 16 so as to tubularly project outside from the body 16. The thicknesses of upper and lower edge parts of the body 16 are reduced to form joining edge parts 41. The lower joining edge part 41 is fitted in the groove 30 of the bottom wall 15.

A central part of the cover 17 is depressed to form a concave part 44 having the shape of a truncated cone. A tubular large holding part 45 and a tubular small holding part 46 are formed integrally with the concave part 44 so as to protrude downward from the lower surface of the concave part 44. The concave part 44 of the cover 17 is formed in a depth such that a fastening nut 37 screwed on the stud bolt 25 to fasten the cover 17 to the body 16 sinks below a plane including the upper surface of the cover 17. A space capable of receiving the wings of the wing nut 38 is formed between the tubular holding parts 45 and 46. A groove 42 is formed in a rising peripheral wall of the cover 17. The cover 17 is put on the body 16 with the central tubular holding part 45 seated on the concave part 36 of the top plate 33 of the cleaner element 13, and the groove 42 receiving the upper joining edge 41 therein. The fastening nut 37 is screwed on the stud bolt 25 to fasten the bottom wall 15, the body 16 and the cover 17 together.

Referring to FIG. 3 showing the carburetor 5 shown in FIGS. 1 and 2 in a plan view, the carburetor 5 is a two-barrel carburetor provided with two intake passages respectively for the two cylinders 1. Two idle adjusting screws 11 are placed at positions corresponding to the two intake passages in an upper wall, respectively.

FIG. 4 is an enlarged longitudinal sectional view of a central part of the air cleaner 4 in a vertical plane including the idle adjusting screws 11. As shown in FIG. 4, a plurality of drain holes 50 are formed in the bottom part of the concave part 44 of the cover 17 at angular intervals so as to open into an annular space Si corresponding to a space inside the tubular wall 19. The two drain holes 50 among the plurality of drain holes 50 are located right above the two idle adjusting screws 11, respectively. A plurality of drain holes 51 are formed in a bottom part of the concave part 36 of the top plate 33 of the cleaner element 13 so as to correspond to the drain holes 50 of the concave part 44 of the cover 17, respectively. Thus, a tool, such as a screw driver, is able to reach each idle adjusting screw 11 through the drain hole 50, located right above the idle adjusting screw 11, of the cover 17, a space S1 surrounded by the tubular holding part 45, the drain hole 51, located right above the idle adjusting screw 11, of the top plate 33 of the cleaner element 13, and the space surrounded by the tubular wall 19. Thus, the idle adjusting screws 11 can be operated without removing the air cleaner 4 and the fuel flow adjusting work can be easily achieved.

Referring to FIG. 5 showing the cover 17 shown in FIGS. 1 and 2 in a plan view, the cover 17 has a substantially square shape having four moderately convex sides, and a hole 60 is formed in a central part thereof. An upper part of the stud bolt 25 extends through the hole 60. The five drain holes 50 are formed on a circle at equal angular intervals. The two drain holes 50 among the five drain holes 50 correspond to the idle adjusting screws 11, respectively. The manufacturer's name M is printed on the upper surface of the cover 17.

Referring to FIG. 6 showing the cleaner element 13 shown in FIG. 2 in a plan view, the concave part 36 of the top plate 33 of the cleaner element 13 is provided with a hole 61 in a central part thereof. The upper part of the stud bolt 25 extends through the hole 61. The number of the drain holes 51 is five. The two drain holes 51 among the five drain holes 51 correspond to the idle adjusting screws 11, respectively.

Figure 7:
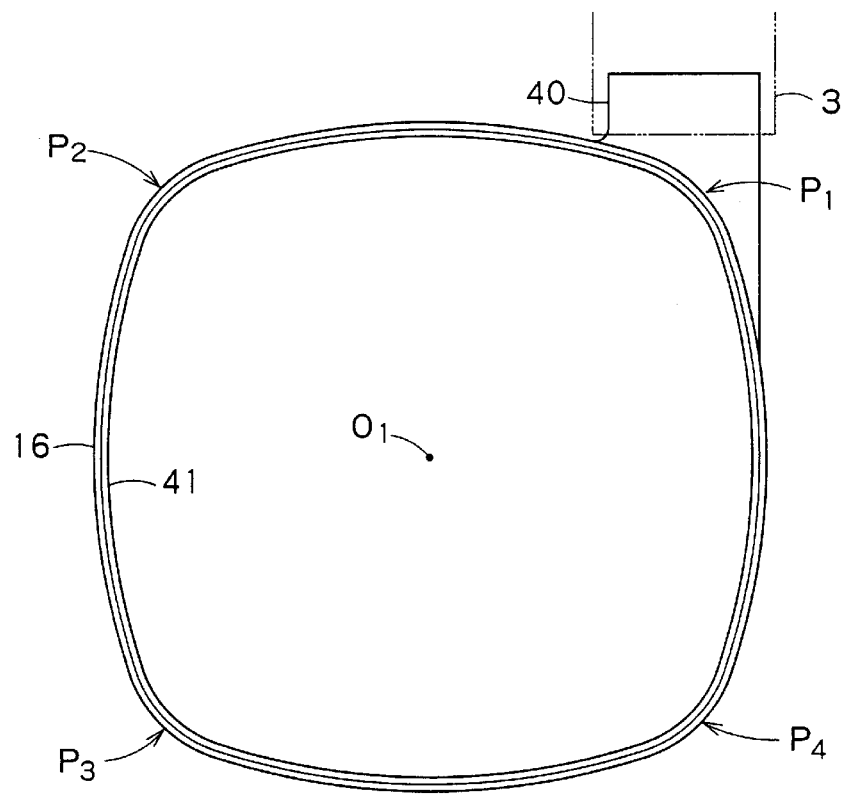
FIG. 7 is a plan view of a body of the air cleaner shown in FIGS. 1 and 2.

Referring to FIG. 7 showing the body 16 shown in FIGS. 1 and 2 in a plan view, the body 16 has a substantially square shape having four moderately convex sides and similar to that of the cover 17. The air inlet 40 projects from one of the corners of the body 16 substantially in parallel to one of the sides of the body 16. An air intake duct 3 is connected to the air inlet 40. The position of the air intake duct 3 is changed according to a type of a work machine or apparatus mounted with the internal combustion engine to take in air from a clean space where air is not affected by dust and heat. Since the body 16 has the square shape, the body 16 can be exactly joined to the cover 17 and the bottom wall 15 and the upper and the lower joining edge part 41 can be fitted in the grooves 30 and 42 even if the same is turned through an angle of 90°, 180° or 270° about the axis $O_1$ of the stud bolt 25.

Figure 8:
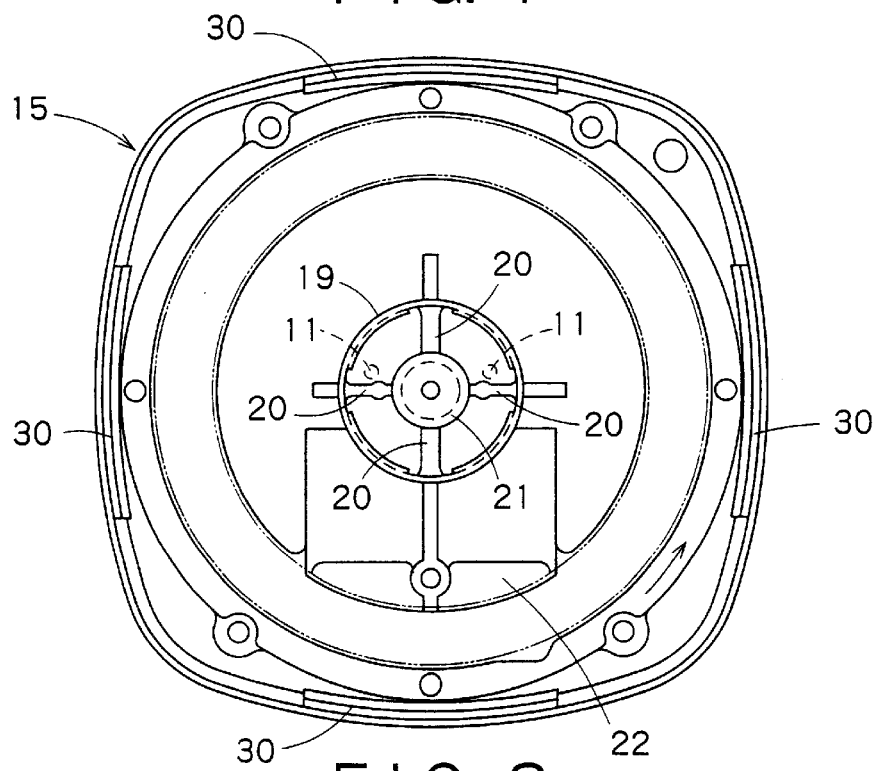
FIG. 8 is a plan view of a bottom wall of the air cleaner shown in FIGS. 1 and 2.

Referring to FIG. 8 showing the bottom wall 15 shown in FIGS. 1 and 2 in a plan view, the central block 21 of the bottom wall 15 is connected to the tubular wall 19 by the four ribs 20 arranged at equal angular intervals. The positions of the ribs 20 are determined such that the ribs 20 do not lie right above the idle adjusting screws 11 and do not obstruct the operation of the tool to adjust the idle adjusting screws 11.

The operation of the air cleaner embodying the present invention will be described hereinafter. Referring to FIG. 2, air taken in through the air intake duct 3 flows through the air inlet 40 into the outer space S3 surrounding the cleaner element 13 of the air cleaner case 14, and is cleaned while the same flows through the cleaner element 13 into the clean air space S2 surrounded by the cleaner element 13. Then, the clean air flows through the air outlet 22 and the connecting pipe 10 into the air passages of the carburetor 5. The clean air is mixed with the fuel in the carburetor 5 to produce an air-fuel mixture. The air-fuel mixture is distributed to the intake ports of the cylinders 1 (FIG. 1).

When the V-engine is used outdoors with the air cleaner 4 exposed to the environment, it is possible, in some cases, that water drops into the concave part 44 of the cover 17 (FIG. 4). However, water dropped into the concave part 44 can be drained through the drain holes 50 and 51 formed in the cover 17 and the top plate 33 of the cleaner element 13. Even if dust collects in the concave part 44, dust can be washed away through the drain holes 50 and 51 together with water by pouring water into the concave part 44. Since the drain holes 50 and 51 are disposed in a space corresponding to the space inside the tubular wall 19, dust and water poured into the concave part 44 do not flow into the air cleaner case 14 and are discharged into a space under the air cleaner case 14. When cleaning or replacing the cleaner element 13, the fastening nut 37 is unfastened, the cover 17 is removed and, if necessary, the wing nut 38 is unfastened to remove the cleaner element 13 from the air cleaner case 14.

Referring to FIG. 2, when the position of the air inlet 40 needs to be changed, the cover 17 is removed, and the body 16 is turned about the axis $O_1$ of the stud bolt 25 at an angular interval of 90° to turn the air inlet 40 to a desired one of four positions $P_1$, $P_2$, $P_3$ and $P_4$ shown in FIG. 7. The body 16 may be inverted and turned likewise to position the air inlet 40 at one of other four positions. Since the position of the cover 17 does not need to be changed when changing the position of the air inlet 40, the manufacturer's name M can be maintained at an initial position in an initial direction as shown in FIG. 5.

Referring to FIG. 4, when adjusting the idle adjusting screw 11, the screw driver is passed from above the air cleaner case 14 through the drain holes 50 and 51 corresponding to the idle adjusting screw 11 to turn the idle adjusting screw 11. Thus the air cleaner 4 does not need to be removed.

Although the air cleaner 4 has been described as disposed above the carburetor 5 in a horizontal position, the air cleaner 4 may be disposed beside the carburetor 5 in a vertical position, and the bottom wall 15 and the cover 17 may be detachably joined to the opposite open ends of the body 16. When the air cleaner 4 is disposed in a vertical position, maintenance work for cleaning or replacing the cleaner element 13 can be achieved by removing the cover 17. The position of the air intake duct 3 can be readily changed by changing the angular position of the body 16 to change the position of the air inlet 40.

Figure 9:
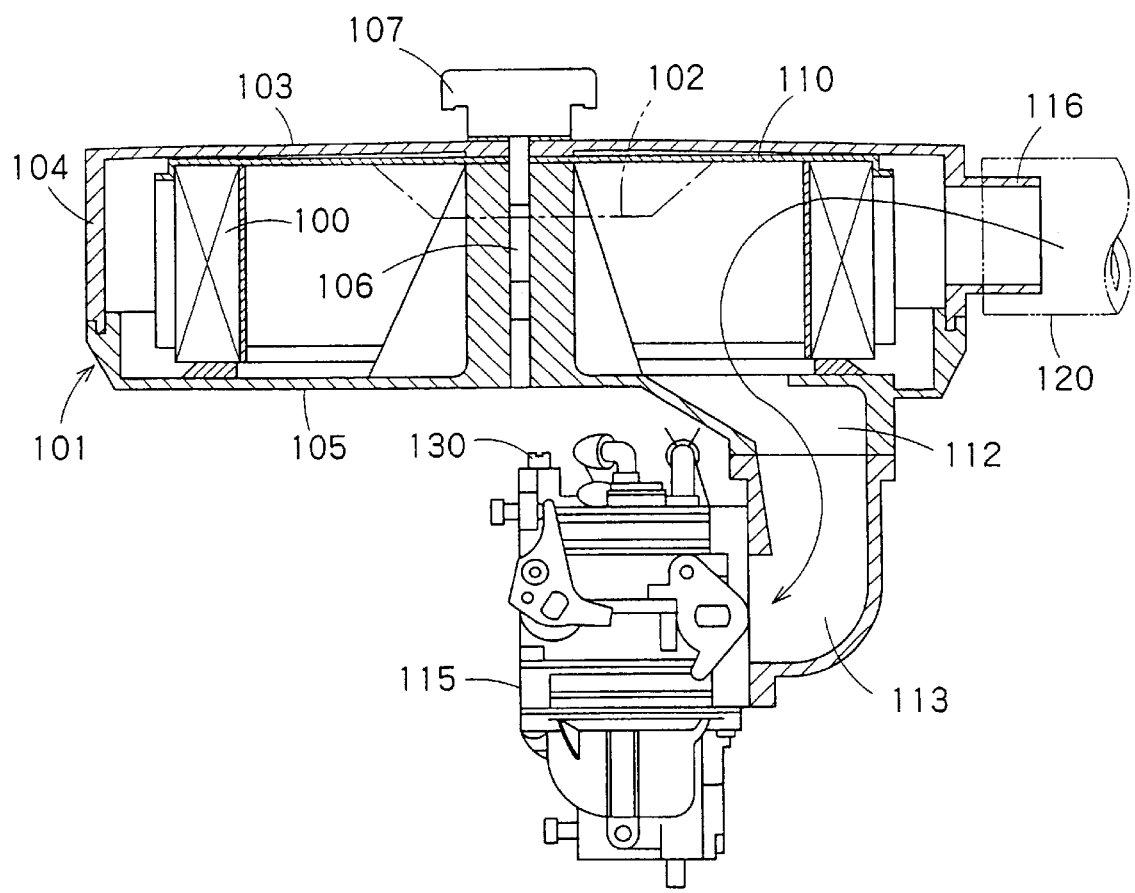
FIG. 9 is a longitudinal sectional view of an ordinary air cleaner.

A structure formed by forming the drain holes 50 in the concave part 44 of the cover 17 is applicable to an air cleaner having a cleaner case formed in a two-part structure, such as the air cleaner case 101 essentially having the body 104 integrally provided with the cover 103, and the bottom wall 105 as shown in FIG. 9.

Although the invention has been described as applied to the air cleaner for the two-cylinder V-engine, the present invention is applicable to air cleaners for various multiple-cylinder internal combustion engines and single-cylinder internal combustion engines.

Although the bottom wall 15, the body 16 and the cover 17 are fastened together by screwing the fastening nut 37 to the upper threaded part of the stud bolt 25 having the lower threaded part screwed in the block 21 formed integrally with the bottom wall 25, the bottom wall 15, the body 16 and the cover 17 may be fastened together by passing a bolt with a head through the cover 17 and the body 16 and screwing the same in the threaded hole formed in the block 21.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An air cleaner for an internal combustion engine, combined with a carburetor, said air cleaner comprising:

a cleaner element for cleaning air;

an air cleaner case holding the cleaner element therein, the air cleaner case including (1) a body having a pair of opposite open ends and provided with an air inlet, (2) a base wall detachably joined to one of the open ends of the body and provided with an air outlet connected to the carburetor, and (3) a cover detachably joined to the other open end of the body; and fastening means that fastens the cover and the base wall to the body, wherein the body, the base wall and the cover of the air cleaner case are individual elements; and the body can be horizontally rotated relative to the cover and the base wall when the cover and the base wall are unfastened from the body.

2. The air cleaner according to claim 1, wherein the cleaner element has an annular shape so as to divide an interior space of the air cleaner case into an inner space connected to the air outlet and an outer space connected to the air inlet; the base wall is provided with a tubular wall projecting from a central part of the base wall toward the cover so that the tubular wall divides the inner space of the cleaner element into a first inner space connected to outside of the air cleaner and a second inner space connected to the air outlet; the fastening means comprises a bolt that connects the cover to the base wall; the cover has a concave part defining a space for receiving a head of the bolt or a nut attached to the bolt; and the concave part of the cover is provided with a drain hole so as to drain water collected in the concave part through the first inner space of the tubular wall.

3. The air cleaner according to claim 2, wherein the air cleaner case is disposed above the carburetor that includes a fuel flow adjusting screw in an upper wall thereof; and the drain hole of the cover is located substantially right above the fuel flow adjusting screw so that fuel flow adjustment can be performed through the drain hole by a screw operating tool.

4. An air cleaner for an internal combustion engine, combined with a carburetor, a said air cleaner comprising:

a cleaner element for cleaning air;

an air cleaner case holding the cleaner element therein, the air cleaner case including (1) a casing having an upper open end, a side wall part provided with an air inlet and a base wall part provided with an air outlet connected to the carburetor, and (2) a cover detachably joined to the upper open end of the casing; and a fastening means that fastens the cover to the casing, wherein the cleaner element has an annular shape so as to divide an interior space of the air cleaner case into an inner space connected to the air outlet and an outer space connected to the air inlet; the base wall part of the casing is provided with a tubular wall projecting from a central part of the base wall part toward the cover so that the tubular wall divides the inner space of the cleaner element into a first inner space connected to outside of the air cleaner and a second inner space connected to the air outlet; the fastening means comprises a bolt that connects the cover to the base wall part of the casing; the cover has a concave part defining a space for receiving a head of the bolt or a nut attached to the bolt; and the concave part of the cover is provided with a drain hole so as to drain water collected in the concave part through the first inner space of the tubular wall.

5. The air cleaner according to claim 4, wherein the air cleaner case is disposed above the carburetor that includes a fuel flow adjusting screw in an upper wall thereof; and the drain hole of the cover is located substantially right above the fuel flow adjusting screw so that fuel flow adjustment can be performed through the drain hole by a screw operating tool.

6. The air cleaner according to claim 1, wherein the cleaner element has an annular shape so as to divide an interior space of the air cleaner case into an inner space connected to the air outlet and an outer space connected to the air inlet; the base wall is provided with a block projecting in the inner space of the cleaner element toward the cover; and the fastening means comprises a bolt that connects the cover to the block of the base wall.

7. The air cleaner according to claim 4, wherein the base wall part of the casing is provided with a block projecting in the inner space of the cleaner element toward the cover; and the fastening means comprises a bolt that connects the cover to the block of the base wall part of the casing.

* * * * *